United States Patent [19]
Taylor et al.

[11] Patent Number: 6,103,307
[45] Date of Patent: Aug. 15, 2000

[54] METHOD AND APPARATUS FOR MECHANIZED APPLICATION OF A PROTECTIVE COATING ON SILICEOUS SURFACES

[75] Inventors: George S. Taylor; Joel S. Miller, both of Salt Lake City, Utah

[73] Assignee: Diamond Seal, Inc., Salt Lake City, Utah

[21] Appl. No.: 09/059,186

[22] Filed: Apr. 13, 1998

Related U.S. Application Data

[63] Continuation-in-part of application No. 08/807,664, Feb. 27, 1997, Pat. No. 5,738,903.

[51] Int. Cl.[7] .................................................. B05D 1/02
[52] U.S. Cl. .......................... 427/336; 427/348; 427/358; 427/368; 427/387; 427/421
[58] Field of Search ..................................... 427/348, 355, 427/356, 358, 368, 336, 387, 421

[56] References Cited

U.S. PATENT DOCUMENTS

| | | |
|---|---|---|
| 2,612,458 | 9/1952 | Stedman . |
| 2,923,653 | 2/1960 | Matlin et al. . |
| 2,962,390 | 11/1960 | Fain et al. . |
| 3,244,541 | 4/1966 | Fain . |
| 3,442,664 | 5/1969 | Heine . |
| 3,772,346 | 11/1973 | Hess . |
| 4,410,563 | 10/1983 | Richter et al. ........................ 427/163 |
| 4,874,431 | 10/1989 | Fey et al. . |
| 5,039,555 | 8/1991 | Ando et al. . |
| 5,540,946 | 7/1996 | De Vries et al. . |

FOREIGN PATENT DOCUMENTS 9-228063  9/1997  Japan .

OTHER PUBLICATIONS

Naviroj et al, J. Macromol. Sci., Phys. (1983), B22(2), pp. 291–304, 1983.

*Primary Examiner*—Erma Cameron
*Attorney, Agent, or Firm*—Trask, Britt & Rossi

[57] ABSTRACT

Methods and apparatus for applying a coating composition of an alkyl alkoxy silane reacted with a vitreous or siliceous substrate under automation is disclosed. The coating provides water repellence, durability and ease of cleaning to glass or other siliceous surfaces. The coating is formed by applying an excess of an alkoxy solution to a substrate followed by removal of excess solution following reaction of the solution to form a monolayer on the substrate. The apparatus of the invention is an automation conveyor system which facilitates formation of a monolayer of coating composition and removal of excess composition to provide a transparent coating on the substrate at a rate of speed exceeding manual application.

11 Claims, 1 Drawing Sheet

METHOD AND APPARATUS FOR MECHANIZED APPLICATION OF A PROTECTIVE COATING ON SILICEOUS SURFACES

CROSS-REFERENCE TO RELATED APPLICATION

This application is a continuation-in-part application of Ser. No. 807,664, filed Feb. 27, 1997, and now issued as U.S. Pat. No. 5,738,903, the contents of which are incorporated herein by reference.

BACKGROUND OF THE INVENTION

1. Field of the Invention

The instant invention relates to the formation of a protective coating on a siliceous substrate through the use of an alkoxy silane to provide a weather-resistant, easily cleaned surface, and specifically relates to the mechanized application of such coatings.

2. State of the Art

Various silane formulations and compositions have been used to provide various types of coatings upon glass or other vitreous or siliceous surfaces. In U.S. Pat. No. 3,244,541 (Fain et al.), a dimethyl diethoxy silane is disclosed as one which in conjunction with a minute amount of sulfuric acid readily forms a protective coating on a vitreous surface.

In U.S. Pat. No. 3,442,664 a polymeric fluorine-containing, hydrolytically-stable organo siloxane having a viscosity from 500 to 500,000 centipoise is utilized as a coating composition. Earlier patents such as those to Stedman (U.S. Pat. No. 2,923,653 and U.S. Pat. No. 2,612,458) and Fain (U.S. Pat. No. 2,962,390) describe various silane wax compositions. The composition utilized in Fain et al. (U.S. Pat. No. 3,244,541) is stated to form a transparent coating but that if a significant amount of sulfuric acid, for example above 0.75% by weight is utilized, the coating is "greasy." Apparently unknown to Fain, it has been discovered that this greasiness also occurs with formulations containing less acid under varying conditions of humidity, temperature and time.

The work of Fain et al. does not describe the various humidity conditions under which the coating compositions of Fain et al. were applied. It has been discovered that at high humidity, the problem of a greasy film is much less likely to occur. The work of Fain et al., if it was done in New York where the headquarters of the corporation to which the patent is assigned is located, results in coatings which would generally have been applied in relatively high humidity conditions.

It has recently been found that there is less problem in obtaining a useful film during application in high humidity conditions. However, application of compositions of Fain et al. in low humidity applications results in greasy films. This greasiness is extremely difficult to remove and the greasy appearance is unacceptable in a coating for glass substrates in which good optical properties are necessary and desired. Thus, windows of buildings cannot be properly coated unless this greasy condition is prevented from occurring.

The formation of non-greasy coatings must be obtainable with every application of a protective coating if a coating system is to be useful in outdoor and indoor environments where conditions of humidity and temperature vary. In most situations, humidity control is not possible during the coating process and may vary during the course of a day or several days where all the windows of a large building, for example, are being coated.

The application of protective coatings in varying conditions of humidity and temperature in a manner which avoids the creation of a greasy film requires the monitoring and detection of the end of the reaction and a removal of excess coating material before significant homopolymerization occurs to cause a greasy film. This aspect of the process was disclosed in the previous application from which this application is a continuation-in-part. The means for detecting the end point of the reaction and the removal of excess coating material was disclosed for small-scale processing of siliceous or vitreous substrates. However, industrial applications require the ability to process and coat large sizes and amounts of glass which, in itself, requires methods and apparatus for quickly and properly coating siliceous or vitreous substrates.

BRIEF SUMMARY OF THE INVENTION

In accordance with the present invention methods and apparatus for applying alkoxy silane coating compositions to siliceous or vitreous substrates under high speed and high volume processing parameters to provide a non-greasy, optically suitable substrate are provided. The techniques and apparatus for applying an alkoxy silane coating to a vitreous or siliceous surface includes the determination of the proper end point at which excess coating solution is to be removed from the substrate to produce a non-greasy, optically suitable substrate. The method and apparatus of the present invention produces coated substrates (e.g., glass) at high speed and high volume as required by many industrial applications where a high number of unit pieces are being processed for use, such as the coating of sheets of glass for window installations in a large office building or hotel.

For the purposes of this invention, a desirable coating for a vitreous substrate is one which is devoid of any greasy film or spots and is optically clear (i.e., light transmissive or transparent). A "greasy film" or "greasy appearing film," for purposes of this invention, is a film which exhibits tackiness, non-uniform light transmissivity and/or non-uniformity of reflected light.

The attainment of a proper coating for the instant invention is one which is essentially a monolayer of an alkoxy silane bonded to a vitreous substrate. The greasy condition generally occurs, it is believed, through homopolymerization of excess silane whereby a non-transparent, greasy film occurs. This homopolymerized film, as could be expected, is very difficult to remove and is unacceptable in appearance and function. The alkoxy silane film reacted with the glass is typically a clear, transparent film although it may be tinted or colored. The usual vitreous surface is glass and the film's excellent transparency is very desirable for windows, mirrors and like surfaces. The film also provides an easily cleaned surface on tile and other vitreous surfaces.

The proper end point of reaction where a monolayer of coating material is formed on the substrate and homopolymerization has been initiated may be detected by determining the change in viscosity of the coating by optical or other techniques described herein to determine the precise moment when the excess coating solution must be removed. Application of the alkoxy coating without the use of a good end point determiner becomes a hit or miss proposition under various conditions of temperature, humidity, etc., resulting in unacceptable coatings and a very uneconomic process.

Formation of the protective coating is initiated by the application of an excess amount of a silane compound having at least one reactive alkoxy site, although preferably two or three such sites, to a vitreous or siliceous substrate. The end point to be determined is when the silane compound has formed at least a complete reacted monolayer on the substrate and initial homopolymerization of the silane compound has started. At such time the excess silane compound is then quickly removed so that all unreacted silane and any minor amount of homopolymerized silane material are promptly removed to provide an optical-quality layer of silane reacted with the substrate surface.

The proper end point may be determined by regularly testing the viscosity to determine that viscosity increase which indicates the initiation of homopolymerization. Also, since the film becomes greasy in appearance upon homopolymerization, the coating solution may be observed with an optical dosimeter to determine the initial light transmission reduction or light diffusion of the film so that the excess coating solution may be removed before such changes in optical properties are actually observable to the unaided eye.

These end point determinations are essential because the elapsed time from initial application of the coating composition at which the end point occurs will vary depending upon humidity, temperature and other conditions, including substrate conditions. The proper end point determination is one which is independent of such variables and can be rigorously obtained, for example, by a light dosimeter, viscosimeter or marking and timing technique, as described hereinafter, which any trained technician could perform accurately. Hit and miss methods are dependent upon the art of the application technician in having a "feel" for when a film may or may not be properly cured whereby the excess coating solution is removed at the proper time so that the reacted film is actually on the glass and homopolymerization of the excess silane has not proceeded to a deleterious point.

The processing of vitreous or siliceous substrates to coat them on a single unit basis (e.g., a single sheet of glass) is different from processing in mass or bulk because of the differences in handling capabilities. That is, with a single piece of substrate material, for example, glass, the end point of the monolayer formation can be checked and re-checked as necessary, with the subsequent removal of excess coating compound by hand. On a single unit basis, removal of the excess material by hand is adequate, but time consuming to the point where hand-removal of excess compound would not be suitable for automation. In industries where a large number of unit pieces of, for example, glass need to be processed and coated quickly for installation in a building, hand processing each unit of glass is impossibly slow and inefficient.

Thus, the present invention provides methods and apparatus for processing large numbers of vitreous or siliceous substrates in an automated manner to produce an appropriate protective coating as previously described. The method of the present invention involves conveying unit pieces of substrate material through apparatus which, if necessary, subjects the substrate to a washing cycle where brushes contact the surface of the substrate with a cleaning solution to remove residual debris. Thereafter, the conveyed substrates are rinsed and quickly dried by such means as an air knife. The substrates are then ready for coating.

The substrates are misted with an amount of alkoxy silane compound sufficient to form a continuous layer of compound on the surface of each substrate. The substrate is then subjected to a removal technique which removes the excess amount of unreacted compound from the substrate to leave a monolayer of coating material on the substrate. The removal technique may be, for example, subjecting the substrate to a liquid knife (e.g., water) or air knife, or both. As used herein, "air knife" refers to the use of any kind of gas and is not intended to be limited to ambient air.

Processing the units to produce a protective coating devoid of a greasy film requires the timely removal of excess alkoxy silane compound, as previously described. But in an automated system, the singular determination of the appropriate end point for each unit piece being processed results in a limitation to effective and efficient processing. Therefore, it has been determined that the appropriate timing for the removal of excess compound can be produced by controlling the amount of compound contacted on the substrate surface and controlling the speed at which the unit pieces are conveyed through the system.

BRIEF DESCRIPTION OF THE DRAWING

The drawing, which illustrates what is currently considered to be the best mode for carrying out the present invention, depicts as follows.

DETAILED DESCRIPTION OF THE ILLUSTRATED EMBODIMENT

Figure 1:
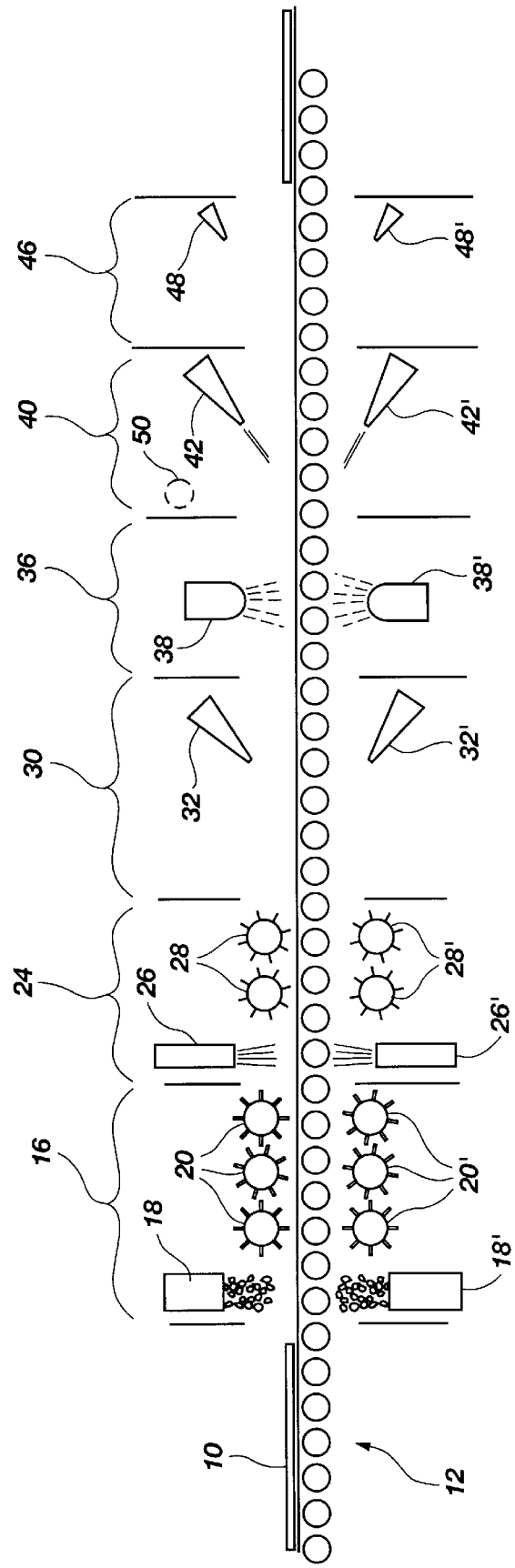
FIG. 1 is a schematic illustration of the apparatus and method for processing vitreous or siliceous substrates to provide each with a desirable coating in accordance with the present invention.

There are many industrial applications where large numbers of vitreous or siliceous members, such as pieces of glass or architectural facades of natural material (e.g., stone), are processed for a particular use. Examples of such industrial applications are the construction of large office buildings or hotels where many windows are to be installed or natural materials, such as stone, are to be installed as the covering for a building. While such glass or natural stone, or other appropriate material, can be treated at a factory to provide a desirable coating prior to installation, transportation of the material after treatment may potentially damage the material or the coating. Therefore, it may be more economical to treat the material at the construction site to lessen or avoid damage. The present invention addresses the methods and apparatus for carrying out the processing of vitreous or siliceous materials on site to economically and quickly produce a large number of unit pieces of material which are coated with a desirable protective coating. For the sake of simplification in describing the present invention, the methods and apparatus for processing glass will be used by way of example only.

FIG. 1 illustrates schematically the apparatus and methods of the present invention in which glass substrates 10, such as a window pane, are conveyed through an automation conveyor system 12 to be treated and processed in accordance with the invention. Although the automation conveyor system 12 is depicted in FIG. 1 as comprising a series of rollers, it is understood that the automation conveyor system 12 may be configured with any suitable device for moving the glass substrate 10 through the apparatus, including rollers or a device which engages only the side edges of the glass substrate 10.

The glass substrates 10 may be processed initially in a different manner depending upon how the glass substrates 10 have been handled previously. That is, the glass substrates 10 may be pre-formed and cleaned prior to delivery to the construction site, or the glass substrates 10 may be cut, ground, beveled or similarly handled, particularly at the job site, so that the surface of the glass substrate 10 is covered with fine particulates and/or dust and dirt. If the glass substrates 10 have been handled in the latter manner, it will be necessary to thoroughly clean, rinse and dry the glass substrate 10 prior to applying the protective coating to the glass substrate 10.

Therefore, as depicted in FIG. 1, the glass substrates 10 may first be conveyed through a cleansing section 16 comprising a dispenser 18 which sprays a cleaning solution on the glass substrates, followed by at least one or a series of brushes 20 which scrub the surface of the glass substrate 10 to remove any embedded particulates. It should be noted that in cases where both sides of the glass substrate 10 are to be treated with the protective coating, cleaning, rinsing and drying apparatus are provided to contact both sides of the glass substrate 10. Thus, as shown in FIG. 1, a dispenser 18' and series of brushes 20' may also be provided to clean the other side of the glass substrate 10.

Siliceous surfaces, such as glass, may generally be cleaned with alcohol and then with water. Generally, for newer surfaces, cleaning with any lower alkyl alcohol, especially denatured alcohol and water may be suitable. Alcohol is utilized to remove any grease or organic matter. It may also be desirable or necessary to use a soapy detergent solution for cleaning the surfaces. Further, it may be necessary or desirable in some instances to only brush the surface of the glass substrates 10 to remove loose particulates rather than apply a cleaning solution, in which case no cleaning solution is dispensed.

The glass substrates 10 are then conveyed through a rinsing section 24 comprising a water delivery apparatus 26, 26' and at least one or a series of brushes 28,28'. The water delivery apparatus 26, 26' directs clean water onto the surfaces of the glass substrates 10 to rinse away the cleaning solution and loosened dirt or particulates. It may or may not be necessary to employ the brushes 28, 28' to provide additional scrubbing to the surfaces of the glass substrates 10. When processing clean, preformed glass substrates 10, it may be desirable to merely spray the surfaces of the glass substrates 10 with water to hydrate the surfaces in very dry and hot conditions since hydration of the surface of the glass substrates 10 improves the protective coating application. After rinsing the glass substrates 10, it is preferred to substantially dry the surfaces of the glass substrates 10, which may be accomplished by conveying the glass substrates 10 through a drying section 30 having an air knife 32, 32'.

The cleaned and substantially dried glass substrates 10 are then conveyed though a coating section 36 where the surface or surfaces of the glass substrates 10 are contacted with a coating solution. Coating solutions useful in forming the weather-resistant films in the instant invention utilize an alkyl alkoxy silane, preferably a dimethyl diethoxy silane, although various other alkyl alkoxy silanes, dialkoxy and trialkoxy are useful, such as trimethyl alkoxy silane, triethyl alkoxy silane and trialkoxy silanes such as methyl or ethyl triethoxy silane and the like. Preferably dialkoxy silanes are used. The alkoxy moiety can include methoxy, ethoxy, propoxy (any isomer), butoxy (any isomer), etc. The alkyl moiety is typically a lower alkyl group such as methyl, ethyl, propyl or butyl group. Additionally, an aryl group such as phenyl and substituted phenyl can be utilized in conjunction with or in replacement of an alkyl group. The alkoxy silane is mixed with a small amount of sulfuric acid, generally from about 0.2% to 0.5% by weight sulfuric, although other acids may be utilized. A preferred composition has about 0.25% sulfuric acid. A coating solution is formed of the alkoxy silane and acid and thoroughly mixed, generally in the absence of a humid atmosphere, and stored in the absence of significant humidity.

The coating solution is applied to the surface or surfaces of the glass substrates 10 by a coating solution dispenser 38, 38', preferably a misting device, which applies a sufficient amount of coating solution to form a continuous layer on the glass substrate 10, but which does not apply an excessive amount of coating solution. It has been found that the controlled application of a minimal amount of coating solution enables the expedited formation of a monolayer of reacted alkoxy silane material on the glass substrate 10 and allows any excess coating solution to be removed quickly before the initiation of homopolymerization, which gives rise to an undesirable greasy film on the glass substrate 10.

Excess amounts of unreacted coating solution are then removed from the glass substrates 10 by a removal device 40 of the apparatus by means of a liquid knife 42, 42' which sprays water or any other suitable liquid at high pressure against the glass substrates 10. The liquid pressure is sufficient to remove excess unreacted material, but not strong enough to disturb the reacted monolayer. The glass substrates 10 are then conveyed through a drying section 46 where the glass substrates 10 are dried by such means as an air knife 48, 48' which subjects the glass substrates 10 to a pressurized stream of air. The excess amounts of unreacted coating solution may also be removed by subjecting the glass substrates 10 to the air knife 48, 48' alone, without subjecting them to the liquid knife 42, 42'.

In the context of an automated processing system as disclosed herein, the ability to control the timing of the formation of the monolayer, coupled with the ability to control the timing of the subsequent removal of any excess unreacted solution, enables the formation of the protective coating to be carried out continuously and quickly on a large number of glass substrates 10. For example, it has been shown that 700 square inches or more of glass substrate can be coated per minute using the methods and apparatus disclosed herein. Thus, by applying a minimal amount of coating solution to the glass substrates 10 and appropriately timing the removal of excess amounts of coating solution in accordance with the particular conditions of heat and humidity, large numbers of glass substrates 10 can be processed without having to monitor the monolayer formation and homopolymerization initiation of each unit piece of glass substrate 10 moving through the automation system.

It has been shown that formation of the monolayer on the glass substrates 10 is favorably influenced by an increase in humidity or by the hydration of the glass substrate 10 in very dry conditions. Therefore, it has been found that in conditions of elevated humidity, glass substrates 10 may be conveyed at a faster speed through the automation conveyor system 12 because the coating solution reacts faster to form the necessary monolayer and subsequent removal of any excess unreacted coating solution should occur more rapidly after application of the coating solution to prevent unwanted homopolymerization. In conditions of little or no humidity, the reaction rate of the coating solution is slower and takes longer to form the monolayer. Hence, the speed of the automation conveyor system 12 should be reduced to provide sufficient time for formation of the monolayer prior to subjecting the glass substrates 10 to removal of the excess amount of coating solution.

Determination of the appropriate speed at which the automation conveyor system 12 should be operated for any given condition of humidity can be made in one of several ways. For example, the end point of the reaction, by which the monolayer is formed, and the initiation of homopolymerization may be determined physically by close examination of the film with a detection device 50, such as a viscosimeter or a dosimeter, or by the unaided eye of a skilled applicator. A viscosimeter determines the viscosity of the film, while a light dosimeter determines the optical qualities, that is, the cloudiness or light transmissivity of the coating. The end point of the reaction may also be determined by previously described techniques of drawing a narrow spatula (one-half inch wide) with a square end across the liquid coating to form a channel (groove) in the liquid. The time required for the two banks of the channel to close over the channel (i.e., the channel disappears), or to "heal," determines the end point of the reaction, and may be from about three seconds to about five seconds. That is, a heal time of less than three seconds has been found to indicate that a monolayer has not yet formed, while a heal time of more than five seconds tends to produce a coating in connection with which homopolymerization is unsuitably advanced. Monitoring the reaction time, and thus the determination of the appropriate speed control for the automation conveyor system 12, may need to be conducted initially, with occasional monitoring as humidity conditions change, but it has been found that one determination of the end point, and consequential determination of the speed of the automation conveyor system 12, is usually only required upon initiation of the automation conveyor system 12.

The method and apparatus of the present invention provides the ability to form a protective coating on a large number of unit pieces of vitreous or siliceous substrates in a short period of time, and provide desirable protective coatings in a consistent manner despite variations in humidity conditions. The method and apparatus can be used for any type of subject substrate and can be adapted for use in a factory or at a job site. Hence, reference herein to specific details of the illustrated embodiments is by way of example and not by way of limitation. It will be apparent to those skilled in the art that many additions, deletions and modifications to the illustrated embodiments of the invention may be made without departing from the spirit and scope of the invention as defined by the following claims.

What is claimed is:

1. A method of applying a continuous protective coating of a silane composition to a vitreous or siliceous substrate in an automated system comprising:

supporting in a conveyor system a substrate for application of a silane composition coating;

applying a silane composition having at least one reactive alkoxy group to said substrate in an amount sufficient to form a continuous layer of said silane composition on said substrate in excess of the amount required to form a monolayer of reacted silane composition to said substrate;

conveying said substrate to a removal system for removing excess amounts of unreacted silane composition upon formation of a reacted monolayer and initiation of homopolymerization of said silane composition; and removing all of said unreacted silane composition and homopolymerized silane material to form a durable transparent, optical quality layer of silane composition reacted with said substrate.

2. The method according to claim 1 wherein said removing all of said unreacted silane compound comprises subjecting said substrate to a high-pressure spray of liquid sufficient to remove said unreacted silane composition.

3. The method according to claim 2 further comprising drying said substrate following subjecting said substrate to a high-pressure spray of liquid.

4. The method according to claim 3 wherein said drying is conducted by subjecting said substrate to an amount of pressurized air sufficient to dry said substrate.

5. The method according to claim 1 further comprising conveying said substrate to a rinsing apparatus and rinsing said substrate with a spray of water, and further comprising substantially drying said substrate prior to applying said silane composition.

6. The method according to claim 5 further comprising contacting said substrate with at least one brush following rinsing said substrate with a spray of water.

7. The method according to claim 5 further comprising applying a cleaning solution to said substrate prior to rinsing said substrate.

8. The method according to claim 7 further comprising contacting said substrate with at least one brush following application of said cleaning solution.

9. The method according to claim 1 further comprising brushing said substrate to clean said substrate prior to applying said silane composition.

10. The method according to claim 1 comprising modifying the speed at which said substrate, to which a silane composition has been applied, is conveyed to said removal system following application of said silane composition, whereby said speed is controlled in accordance with the prevailing humidity conditions of the ambient atmosphere to provide a monolayer of reacted silane composition.

11. The method of claim 1 wherein the humidity conditions and rate of conveyor speed are both controlled to provide the formation of a monolayer of reacted silane composition between the time said silane composition is applied to said substrate and said substrate is subjected to the excess silane composition removal step.

* * * * *